US006929247B2

(12) United States Patent
Kienzler et al.

(10) Patent No.: US 6,929,247 B2
(45) Date of Patent: Aug. 16, 2005

(54) VALVE FOR THE CONTROL OF FLUIDS

(75) Inventors: Dieter Kienzler, Leonberg (DE); Dietmar Uhlmann, Korb (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 10/250,775

(22) PCT Filed: Nov. 7, 2002

(86) PCT No.: PCT/DE02/04119

§ 371 (c)(1), (2), (4) Date: Jul. 9, 2003

(87) PCT Pub. No.: WO03/042531

PCT Pub. Date: May 22, 2003

(65) Prior Publication Data

US 2004/0046059 A1 Mar. 11, 2004

(30) Foreign Application Priority Data

Nov. 10, 2001 (DE) ........................................ 101 55 413

(51) Int. Cl.[7] ................................................ F16K 31/02

(52) U.S. Cl. .............. 251/367; 251/129.15; 239/533.11

(58) Field of Search ............................ 251/367, 129.15, 251/129.18; 285/355; 411/302–304; 239/533.2, 533.3, 533.6, 533.9, 533.11

(56) References Cited

U.S. PATENT DOCUMENTS

| | | | | |
|---|---|---|---|---|
| 4,176,822 A | * 12/1979 | Chadwick | .............. | 251/129.06 |
| 5,467,963 A | * 11/1995 | Crofts et al. | ........... | 251/129.18 |
| 6,719,221 B2 | * 4/2004 | Klugl et al. | ............. | 239/533.3 |

* cited by examiner

*Primary Examiner*—Justine R. Yu
*Assistant Examiner*—Peter deVore
(74) *Attorney, Agent, or Firm*—Ronald E. Greigg

(57) ABSTRACT

A valve for controlling fluids, which has a plurality of components that are disposed in succession in the axial direction of the valve. On at least one of the components, a male thread is embodied in order to enter into engagement with a female thread of a lock nut. The lock nut serves to brace the components of the valve. A sealing element is disposed between the female thread of the lock nut and the male thread of the component.

3 Claims, 4 Drawing Sheets

VALVE FOR THE CONTROL OF FLUIDS

CROSS-REFERENCE TO RELATED APPLICATIONS

This application is a 35 USC 371 application of PCT/DE 02/04119 filed on Nov. 7, 2002.

BACKGROUND OF THE INVENTION

1. Field of the Invention

The present invention relates to a valve for controlling fluids and more particularly to an injection valve for injecting fuel into a combustion chamber of an internal combustion engine.

2. Description of the Prior Art

Injection valves for injecting fuel into a combustion chamber of an internal combustion engine are known in various embodiments. For instance, such injection valves are used in conjunction with reservoir-type injection systems, in which fuel is stored in a reservoir at high pressure in order to enable injection of the fuel at a constant pressure. Such injection valves comprise multiple components, such as a retaining body, a valve plate, a throttle plate, and a nozzle body, that are disposed in succession in the axial direction of the valve. The individual components of the valve are braced against one another by means of a nozzle lock nut. By using the individual components in combination with the high pressure in reservoir-type injection systems, however, sealing problems arise that can cause leakage of fuel at the valve. To prevent fuel from escaping from the valve to the outside, for instance into the engine compartment, suitable seals are necessary. In this respect, it is known for instance to exert high pressures per unit of surface area between the individual components, to provide adequate sealing on their flat contact faces. Because of an asymmetrical arrangement of bores in the components, particularly between an actuator bore and a high-pressure bore, different rigidities in the circumferential direction result, so that so-called sweating leaks can occur. In addition, there are typically uneven places and roughness on the flat sealing faces of the individual components, which can again cause leaks. Furthermore, because of the heavy load via the high pressures per unit of surface area, deformations can occur at the sealing planes between the individual components, which can also cause a leakage of fuel.

Another known possibility for sealing off the injection valve is for instance that a sealing element, such as an O-ring, is disposed on the upper end of the nozzle lock nut. Often, for receiving the sealing element on the retaining body, a recess is provided. In this known version, however, particularly when an O-ring is used, assembly problems can arise, since during the assembly the O-ring can become twisted, as a result of which the seal can no longer be reliably assured. Moreover, because of the recess formed in the retaining body for receiving the sealing element, additional notch points are created in the valve, at which cracking can develop in the component.

In view of still higher pressure systems contemplated in the future of between 1800 and 2000 bar, the injection valve sealing problems described above will only become worse.

SUMMARY AND ADVANTAGES OF THE INVENTION

The valve for controlling fluids of the invention has the advantage over the prior art that it enables secure, simple sealing and can be furnished especially inexpensively.

Moreover, in the valve of the invention no geometric weakening that could cause an additional notch effect at the valve occurs at the components of the valve. These advantages are attained according to the invention in that between a thread of a lock nut that serves to brace the individual components of the valve and a thread disposed on a component, for screwing to the lock nut, a sealing element is disposed. By means of this positioning of the sealing element between the two thread courses, it is unnecessary for a recess for receiving a sealing element to be embodied in one of the components; such a recess can reduce the strength of the component and cause a notch effect. Moreover, an economical, simple assembly of the sealing element is also thus made possible. Thus according to the invention, an economical, simple embodiment of a seal sealing off the valve from the outside can be furnished.

Preferably, the sealing element is embodied as a plastic ring or as a shrink-fit hose. The shrink-fit hose is preferably made from plastic, such as PTFE, and is placed over the male thread on the component. When the lock nut is mounted on the component that has the male thread, the shrink-fit hose then presses against the thread courses such that secure sealing is obtained.

To enable simple positioning of the plastic ring, a recess for receiving the plastic ring is preferably embodied on the lock nut. Especially preferably, this recess is provided on the upper end of the lock nut.

To enable secure positional fixation of the plastic ring on the lock nut, the plastic ring preferably has at least one protruding region, which engages a correspondingly formed additional recess on the lock nut. To that end, one or more bores or one or more grooves can be provided on the lock nut. An inward-oriented flanged-over portion can also be provided on the outermost end region of the lock nut.

In another preferred feature of the present invention, the sealing element is embodied as a coating. The coating can be applied simply and economically either to the male thread on the component or to the female thread on the lock nut, or to both threads. Preferably, the coating is made from PTFE or some other plastic or adhesive that can be applied in liquid form.

In order to absorb any sweat leakage that might occur between the individual components of the valve, a groove is preferably provided between two components, by way of which groove the leakage can be carried away into a low-pressure region of the valve.

The present invention is used particularly in fuel injection valves for reservoir-type injection systems, such as common rail injection systems. As a result of the sealing between the lock nut and the components of the valve, a low-pressure region of the valve is sealed off from the outside. The sealing elements of the invention are designed such that once the valve has been disassembled, easy reassembly together with the sealing element is possible.

BRIEF DESCRIPTION OF THE DRAWINGS

Several exemplary embodiments of the invention are described in further detail herein below, in conjunction with the drawings, in which.

DESCRIPTION OF THE PREFERRED EMBODIMENTS

Below, a valve 1 with a sealing element in accordance with a first exemplary embodiment of the present invention will be described in conjunction with FIGS. 1 and 2.

Figure 1:
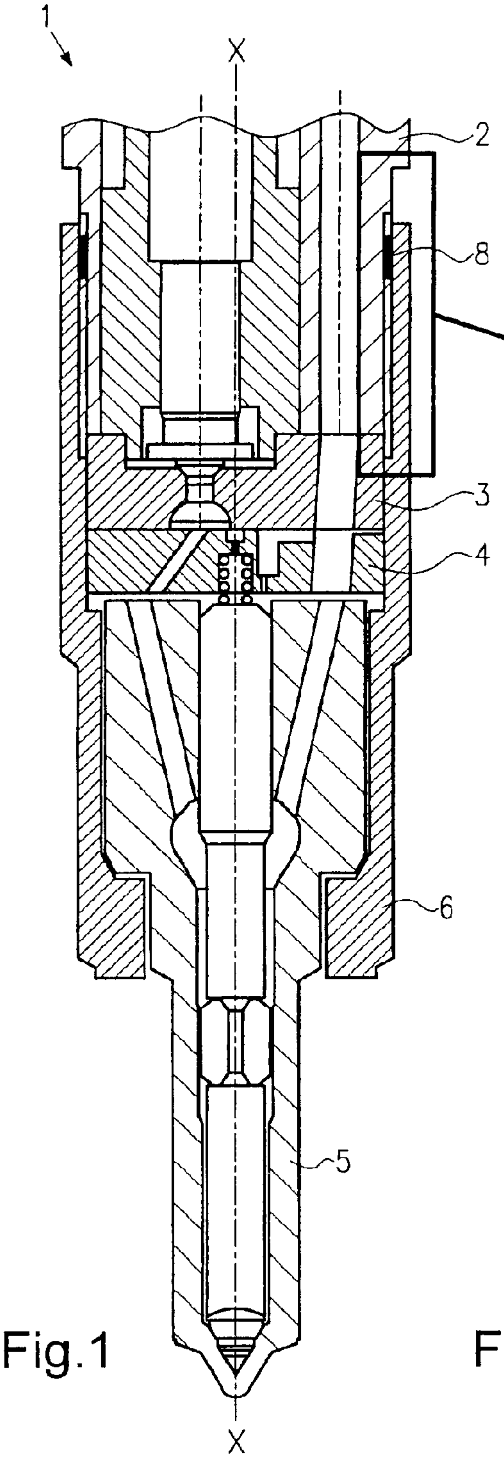
FIG. 1 shows a schematic sectional view through a valve with a seal, in a first exemplary embodiment of the present invention.

In FIG. 1, a fuel injection valve 1 is shown, which essentially comprises a plurality of components disposed in succession in the axial direction X—X of the valve. The components of the valve 1 are a retaining body 2, a valve plate 3, a throttle plate 4, and a nozzle body 5. These components of the valve are braced against one another by means of a nozzle lock nut 6. To that end, the nozzle lock nut 6, in its upper end region, has a female thread 10 (see FIG. 2), with which it is screwed onto a male thread 9 of the retaining body 2.

Figure 2:
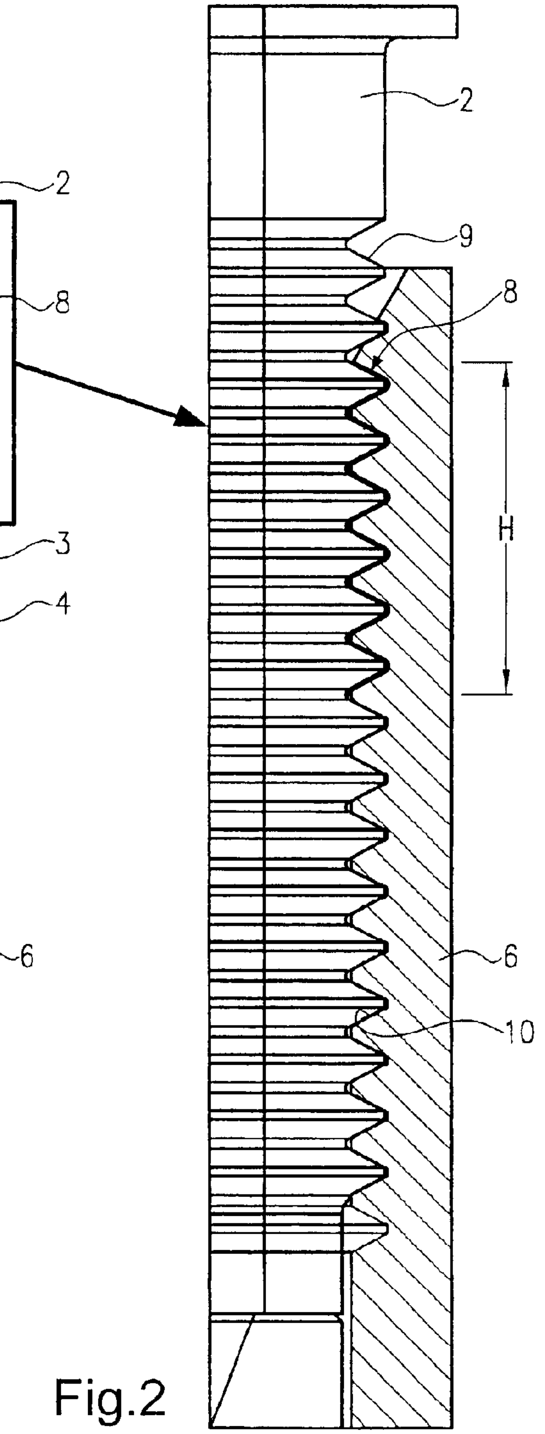
FIG. 2 shows an enlarged detail of the valve shown in FIG. 1.

As shown particularly in FIG. 2, a sealing element in the form of a coating 8 is disposed between the female thread 10 of the nozzle lock nut 6 and the male thread 9 of the retaining body 2. The coating 8 can be applied either to the female thread 10 or the male thread 9 or both threads. The coating 8 extends over the entire circumference of the thread. As a result of this coating 8 according to the invention, secure sealing off of a low-pressure region of the valve 1 from the outer environment is achieved.

As can be seen from FIG. 2, the coating 8 is embodied essentially on the upper end region of the nozzle lock nut 6 and has a height H which is between ⅓ and ½ the height of the thread course in the axial direction of the valve. The coating 8 can be simply applied to one or both threads before assembly, so that the seal exists once the nozzle lock nut 6 has been screwed onto the retaining body 2.

Figure 3:
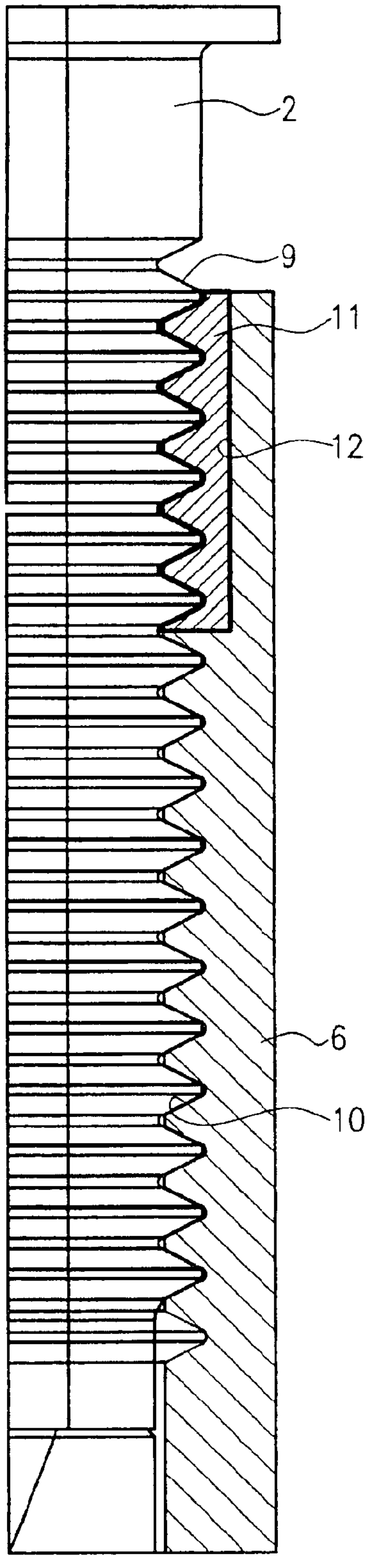
FIG. 3 shows an enlarged detail of a seal in a second exemplary embodiment of the present invention.
Figure 4:
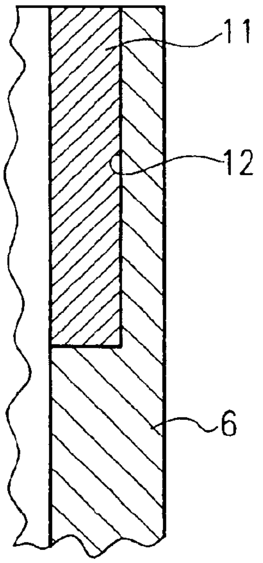
FIG. 4 shows the seal of the second exemplary embodiment in a state before assembly.

In FIGS. 3 and 4, sealing in accordance with a second exemplary embodiment of the present invention is shown. Functionally identical parts are identified by the same reference numerals as in the first exemplary embodiment.

In contrast to the first exemplary embodiment, in the second exemplary embodiment a plastic ring 11 is used as the sealing element. In FIG. 3, the plastic ring is shown in the mounted state, that is, with the nozzle lock nut 6 screwed onto the retaining body 2, and in FIG. 4, the plastic ring 11 is shown before assembly. As a comparison of FIGS. 3 and 4 directly shows, the plastic ring 11 is deformed upon assembly in such a way that it presses very tightly against the male thread 9 of the retaining body 2. As a result, adequate sealing is achieved between the low-pressure region of the valve and the outside. The plastic ring 11 has a height such that it covers approximately ⅓ of the thread courses engaging one another. Thus in the second exemplary embodiment, the sealing element itself forms a part of the thread, so that a simple, economical seal can be achieved. The seal results automatically when the nozzle lock nut is screwed onto the retaining body 2. As the thread on the retaining body 2, an M17×0.75 thread is preferably used. The plastic ring 11 is disposed in a recess 12 provided on the end region of the nozzle lock nut 6.

Figure 5:
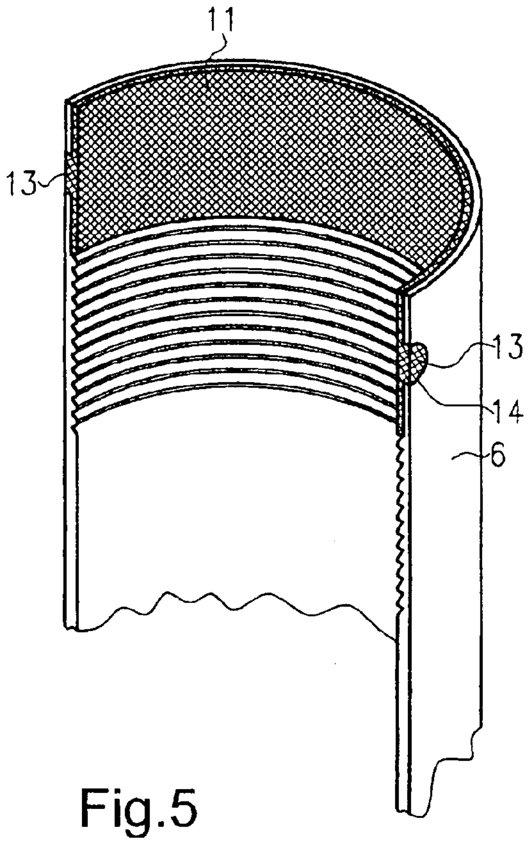
FIG. 5 shows one possibility for fixing the seal of the second exemplary embodiment.
Figure 6:
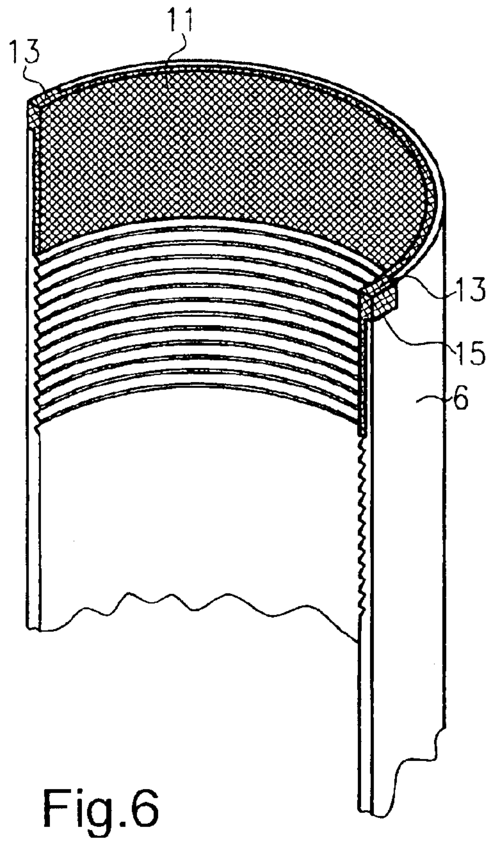
FIG. 6 shows another possibility for fixing the sealing element of the second exemplary embodiment.
Figure 7:
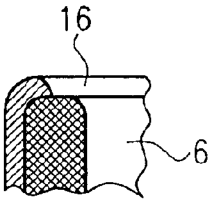
FIG. 7 shows a further possibility for fixing the sealing element of the second exemplary embodiment.

In FIGS. 5–7, various possibilities for the fixation of the plastic ring 11 to the nozzle lock nut 6 are shown. For instance, in FIG. 5, two bores 14 diametrically opposed to one another are provided, which are each engaged by two respective protruding regions 13 embodied to suit the bore 14. A similar positional fixation of the plastic ring 11 is shown in FIG. 6, in which two opposed protruding regions 13 engage two correspondingly embodied grooves 15 in the upper end region of the nozzle lock nut 6. In the exemplary embodiment shown in FIG. 7, the positional fixation comprises a flanged-over portion 16, which is oriented toward the inside of the nozzle lock nut 6 and fixes the plastic ring 11.

Figure 8A:
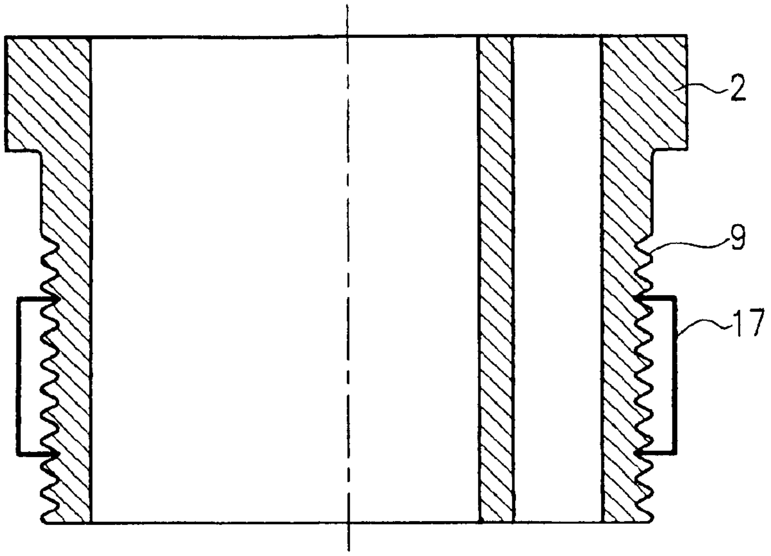
FIGS. 8*a*–8*c* show the assembly of a sealing element in a third exemplary embodiment of the present invention.
Figure 8B:
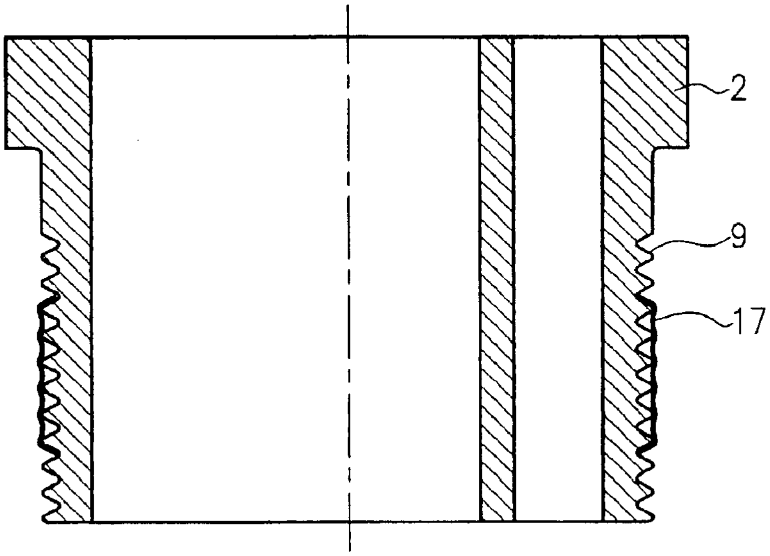
Figure 8C:
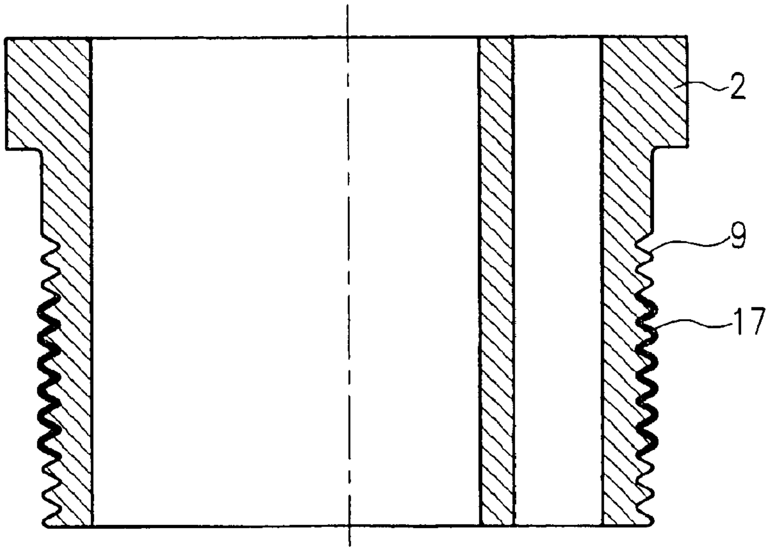

In FIGS. 8*a*–8*c*, a sealing element is shown in accordance with a third exemplary embodiment of the present invention. The sealing element of the third exemplary embodiment comprises a shrink-fit hose 17, which is applied to the male thread 9 of the retaining body 2. In FIG. 8*a*, the shrink-fit hose 17 is shown in the expanded state, in which it is applied to the male thread 9 of the retaining body 2. As FIG. 8 a shows, the height of the shrink-fit hose 17 amounts to approximately half the height of the thread 9. In FIG. 8*b*, the shrink-fit hose 17 is shown in the mounted state, in which it rests on the thread tips of the male thread 9. When the nozzle lock nut is then screwed onto the male thread 9 of the retaining body 2, the shrink-fit hose 17 is deformed such that it rests directly on the male thread 9 and on the female thread of the nozzle lock nut. This state of the shrink-fit hose 17 is shown in FIG. 8*c*. For the sake of simplifying the drawing, the nozzle lock nut is not shown in FIG. 8*c*. Thus the shrink-fit hose 17 rests tightly between the two threads, so that a secure sealing off of the fuel injection valve from the outside is achieved. Once the nozzle lock nut 6 has been disassembled, the shrink-fit hose 17 can also remain on the retaining body 2 and be used again.

The present invention thus relates to a valve for controlling fluids which has a plurality of components 2, 3, 4, 5 that are disposed in succession in the axial direction X—X of the valve. On at least one of the components, a male thread 9 is formed, so as to engage a female thread of a lock nut 6. The lock nut 6 serves to brace the components of the valve. A sealing element 8, 11, 17 is disposed between the female thread 10 of the lock nut 6 and the male thread 9 of the component 2.

The above description of the exemplary embodiments of the present invention is intended solely for illustrative purposes and not for the sake of limiting the invention. Various changes and modifications can be made within the context of the invention without departing from the scope of the invention or its equivalents.

What is claimed is:

1. A valve for controlling fluids, the valve comprising a plurality of components (2, 3, 4, 5) disposed in succession in the axial direction (X—X) of the valve, a male thread (9) formed on at least one of said components (2), a lock nut (6) having a female thread (10) which in the mounted state of the valve is in engagement with the male thread (9) of at least one component (2), in order to brace the components (2, 3, 4, 5) against one another, and a sealing element (8; 11; 17) disposed between the female thread (10) of the locknut (6) and the male thread (9) of the component (2), wherein the sealing element is embodied as a plastic ring (11) or as a shrink-fit hose (17), and wherein the plastic ring (11) comprises at least one protruding region (13) for positional fixation of the plastic ring.

2. The valve of claim 1, wherein the lock nut 6 further comprises a flanged-over portion (16) for fixing the plastic ring (11).

3. A valve for controlling fluids, the valve comprising a plurality of components (2, 3, 4, 5) disposed in succession in the axial direction (X—X) of the valve, a male thread (9) formed on at least one of said components (2), a lock nut (6) having a female thread (10) which in the mounted state of the valve is in engagement with the male thread (9) of the at least one component (2), in order to brace the components (2, 3, 4, 5) against one another, and a sealing element (8; 11; 17) disposed between the female thread (10) of the lock nut (6) and the male thread (9) of the component (2), wherein the sealing element is embodied as a plastic ring (11) or as a shrink-fit hose (17), and wherein the lock nut 6 further comprises a flanged-over portion (16) for fixing the plastic ring (11).

* * * * *